United States Patent
Kunimatsu

(10) Patent No.: US 11,604,613 B2
(45) Date of Patent: Mar. 14, 2023

(54) SUPPORT PROGRAM FOR DRIVERLESS GENERAL-PURPOSE PRINT PROGRAM, INFORMATION PROCESSING DEVICE, AND PRINTING METHOD FOR AGGREGATE PRINTING

(71) Applicant: BROTHER KOGYO KABUSHIKI KAISHA, Nagoya (JP)

(72) Inventor: Akihiro Kunimatsu, Okazaki (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/215,073

(22) Filed: Mar. 29, 2021

(65) Prior Publication Data

US 2021/0216250 A1    Jul. 15, 2021

Related U.S. Application Data

(63) Continuation of application No. PCT/JP2020/025801, filed on Jul. 1, 2020.

(30) Foreign Application Priority Data

Sep. 30, 2019   (JP) .............................. JP2019-179043

(51) Int. Cl.
  *G06F 3/12*   (2006.01)
  *G06K 15/02*   (2006.01)
(52) U.S. Cl.
  CPC .............. *G06F 3/122* (2013.01); *G06F 3/125* (2013.01); *G06K 15/1836* (2013.01)
(58) Field of Classification Search
  CPC ...................................................... G06F 3/122
  (Continued)

(56) References Cited

U.S. PATENT DOCUMENTS

2002/0016799 A1   2/2002 Nakagiri et al.
2007/0052979 A1*  3/2007 Burlingame ......... H04N 1/3875
                                        358/1.1
(Continued)

FOREIGN PATENT DOCUMENTS

JP   2002-079716 A   3/2002
JP   2007-133756 A   5/2007
(Continued)

OTHER PUBLICATIONS

International Search Report with translation and Written Opinion with partial translation dated Sep. 8, 2020 issued in PCT application No. PCT/JP2020/025801.

*Primary Examiner* — Jacky X Zheng
(74) *Attorney, Agent, or Firm* — Scully Scott Murphy and Presser

(57) ABSTRACT

An non-transitory computer readable medium stores a program causing a computer installed in an information processing device to execute a process corresponding to a printer connected to the information processing device. The process includes receiving image data for images of a plurality of pages from a general-purpose print program which is pre-installed in an OS of the computer, generating composite image data corresponding to an composite image which is generated by reducing images of the plurality of pages in size and arranging the reduced images for the N pages so that the reduced images fit on one surface of the sheet, from the image data received in the receiving of the image data, and causing the information processing device to transmit print data which is rasterized based on the composite image data to the printer.

13 Claims, 10 Drawing Sheets

(58) Field of Classification Search
USPC .......................................................... 358/1.2
See application file for complete search history.

(56) References Cited

U.S. PATENT DOCUMENTS

| | | |
|---|---|---|
| 2013/0044335 A1 | 2/2013 | Kobayashi |
| 2013/0250361 A1* | 9/2013 | Minegishi ............. G06F 3/1205 |
| | | 358/1.18 |
| 2020/0012460 A1* | 1/2020 | Shibamori ............ G06F 3/1256 |

FOREIGN PATENT DOCUMENTS

| | | |
|---|---|---|
| JP | 2009-301291 A | 12/2009 |
| JP | 2013-041449 A | 2/2013 |
| JP | 2015-170295 A | 9/2015 |
| JP | 2017-121695 A | 7/2017 |

* cited by examiner

SUPPORT PROGRAM FOR DRIVERLESS GENERAL-PURPOSE PRINT PROGRAM, INFORMATION PROCESSING DEVICE, AND PRINTING METHOD FOR AGGREGATE PRINTING

CROSS-REFERENCE TO RELATED APPLICATIONS

This is a continuation application of International Application No. PCT/JP2020/025801 filed on Jul. 1, 2020 which claims priority from Japanese Patent Application No. 2019-179043 filed on Sep. 30, 2019. The entire contents of the earlier applications are incorporated herein by reference.

TECHNICAL FIELD

The technical field disclosed in the present specification relates to a support program that supports printer control, an information processing device, and a printing method.

BACKGROUND ART

As a technique for controlling a printer from an information processing device including a personal computer, for example, as disclosed in JP-A-2017-121695, there is a widely known configuration in which by a printer driver, a job that is set to aggregate printing in which images of a plurality of pages are printed on one sheet is inputted to a printer.

In recent years, a technique of controlling a printer by a print program that is installed in an operating system (hereinafter, referred to as "OS") as a standard function without using the printer driver described above has been put into practical use. In this technique, when the OS associates the printer with the OS standard print program and subsequently receives a print instruction for the printer, it is possible to print using the OS standard print program without using the printer driver.

However, in the printing by the OS standard general-purpose print program, selectable setting items are limited to generally registered items in the OS standard print program when the print parameters are selected. As a result, aggregate printing may not be supported, which causes the user inconvenience. Further, although it is possible to perform the aggregate printing by the processing on the printer, in that case, a load may be imposed on the printer, for example, memory consumption in the printer becomes large.

The present specification discloses a technique for causing a printer to perform aggregate printing in a method that does not impose a load on the printer in an information processing device having an OS standard print program installed therein.

SUMMARY OF INVENTION

According to an aspect of the invention, an non-transitory computer readable medium stores a program causing a computer installed in an information processing device to execute a process corresponding to a printer connected to the information processing device. The process includes, in a case where a print instruction output from an application program installed in the information processing device and causing the printer to print images is sent to a general-purpose print program pre-installed in an operating system of the information processing device, and in a job based on the print instruction, the printer is caused to execute aggregate printing in which images for N pages are printed on one surface of a sheet, N being a natural number of 2 or more, receiving image data for images of a plurality of pages from the general-purpose print program, generating composite image data corresponding to composite image which is generated by reducing images of the plurality of pages in size and arranging the reduced images for the N pages so that the reduced images fit on one surface of the sheet, from the image data received in the receiving of the image data, and causing the information processing device to transmit print data which is rasterized based on the composite image data to the printer.

In the support program disclosed in this specification, when a print instruction is output from the application program to the general-purpose print program and the printer performs aggregate printing of images in a job based on the print instruction, the image data for images of a plurality of pages is received from the general-purpose print program 41 and composite image data in which images for N pages are arranged so as to fit on one surface of the sheet is generated. Further, the support program causes the information processing device to transmit print data based on the composite image data to the printer. As a result, even if the general-purpose print program does not support aggregate printing, it is possible to cause the printer to perform aggregate printing.

An information processing device in which the above program is installed, a computer-readable storage medium storing the program, and a control method for realizing the function of the program are also novel and useful.

According to the technique disclosed in the present specification, it is possible to realize a technique for causing a printer to perform aggregate printing in a method that does not impose a load on the printer in an information processing device having an OS standard print program installed therein.

DETAILED DESCRIPTION OF EMBODIMENTS

Hereinafter, a personal computer (hereinafter, referred to as a "PC") that uses the program of a first embodiment will be described in detail with reference to the accompanying drawings. This embodiment discloses an embodiment embodying a program executed by a PC connected to a printer having a printing function.

Figure 1:
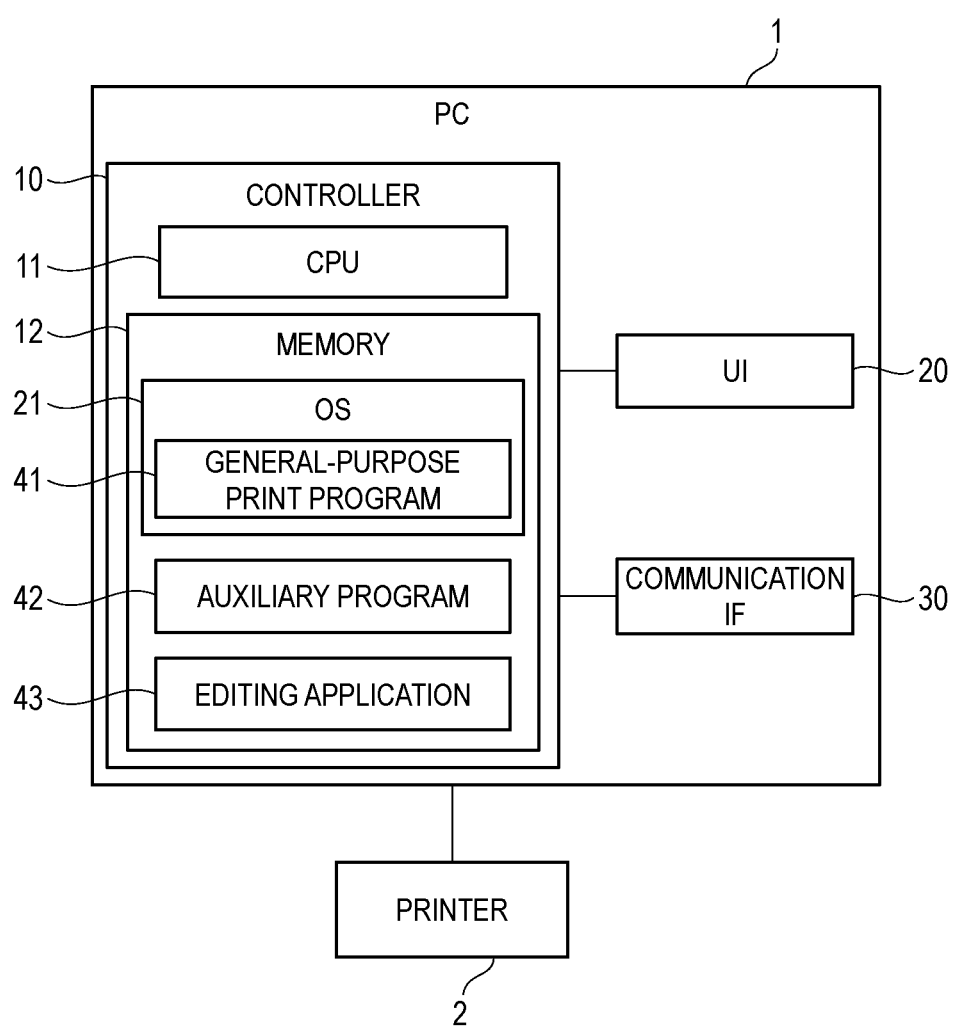
FIG. 1 is a block diagram showing the electric configuration of a PC.

A PC 1 of the present embodiment includes, for example, as shown in FIG. 1, a controller 10, a user interface (hereinafter referred to as "UI") 20, and a communication interface (hereinafter referred to as "communication IF") 30. The UI 20 and the communication IF 30 are electrically connected to the controller 10. The PC 1 is an example of an information processing device. A printer 2 is a device having a printing function and is connected to the PC 1 via local communication or network communication.

The UI 20 includes hardware that performs various displays and receives an instruction input by a user. The UI 20 may be a touch panel having both a display function and an input receiving function or may be a combination of a display having a display function and a keyboard or mouse having an input receiving function.

The communication IF 30 includes hardware for communicating with an external device including the printer 2 and hardware for accessing the Internet. The communication IF 30 may include a plurality of interfaces having different communication methods. Communication methods may include network communication and USB communication. Further, the communication may be wired communication or wireless communication.

The controller 10 includes a CPU 11 and a memory 12. The CPU 11 is an example of a computer. The memory 12 includes a ROM, a RAM, and a non-volatile memory and stores programs including various application programs (hereinafter referred to as "applications") and various data. The CPU 11 executes various processes according to the program read from the memory 12 and based on the user's instruction. The controller 10 in FIG. 1 is a collective term for hardware and software used for controlling the PC 1 and does not necessarily represent a single piece of hardware actually existing in the PC 1.

An example of the memory 12 may be a computer-readable storage medium. A computer-readable storage medium is a non-transitory medium. In addition to the above examples, the non-transitory medium includes a recording medium including a CD-ROM and a DVD-ROM. The non-transitory medium is also a tangible medium. On the other hand, an electric signal that carries a program downloaded from a server or the like on the Internet is a computer-readable signal medium that is a kind of computer-readable medium but is not included in the non-transitory computer-readable storage medium.

For example, as shown in FIG. 1, the memory 12 stores an OS 21 including a general-purpose print program 41, an auxiliary program 42, and an editing application 43. The auxiliary program 42 is an example of a support program. The editing application 43 is an example of an application program. The OS 21 is, for example, Microsoft Windows (registered trademark), MacOS (registered trademark), or Linux (registered trademark). The memory 12 stores various data including information on the connected printer 2 and various programs including a browser in addition to the illustrated ones.

The general-purpose print program 41 is an OS standard program for executing printing with various printers including the printer 2 according to an instruction from the PC 1. The general-purpose print program 41 of the present embodiment is a program including a function of generating print data used by a corresponding printer for printing based on image data to be printed.

The general-purpose print program 41 supports a function that is commonly usable by printers of a plurality of types of models provided by vendors of various printers. The general-purpose print program 41 does not support all the functions uniquely provided in various printers and the supported functions are limited to the general-purpose functions.

The auxiliary program 42 is a program or a program group that executes processing based on an instruction from the OS 21 accompanying the processing of the general-purpose print program 41 and is an application that supports the control of target hardware. The auxiliary program 42 of this embodiment supports the model of the printer 2 connected to the PC 1 and is activated from the general-purpose print program 41, for example, when the general-purpose print program 41 is used to receive an instruction to cause the printer 2 to execute printing. The auxiliary program 42 is called, for example, a hardware support application (abbreviation: HSA).

The auxiliary program 42 receives a plurality of types of commands from the general-purpose print program 41 and executes various processes based on the received commands. The auxiliary program 42 is configured to execute different processes depending on the content of the execution command from the general-purpose print program 41. The auxiliary program 42 may be a combination of a plurality of programs that each receive an execution command or may be one program that is configured to execute different processes according to commands.

The auxiliary program may be a program prepared for each printer type by the printer vendor. For example, an auxiliary program for an inkjet printer or an auxiliary program for a laser printer is prepared. The printer vendor registers the auxiliary program in the platform provided by the OS 21 vendor according to the procedure specified by the OS 21 vendor. When a printer is newly connected to the PC 1 and an auxiliary program corresponding to the printer is registered in the platform, the OS 21 downloads the auxiliary program from a server storing the auxiliary program and installs the auxiliary program in the PC 1. Then, the OS 21 stores the identification information of the installed auxiliary program in the memory 12 in association with the printer information of the newly connected printer. There may be an auxiliary program prepared not only for each printer type but for each printer model or each printer model series.

The editing application 43 is, for example, an application for creating and editing image data and document data. The editing application 43 may be Microsoft Word or PowerPoint. The editing application 43 may be an application provided by a vendor of the printer 2 or the like. The editing application 43 receives a user operation including an instruction to cause the printer 2 to perform a predetermined operation. Specifically, the editing application 43 receives, for example, a print instruction for causing the printer 2 to execute printing, via the UI 20.

The processing in the embodiment and each processing step in the flowchart basically indicate processing by the CPU 11 according to a command described in a program including the auxiliary program 42. That is, the processes such as "determination", "extraction", "selection", "calculation", "decision", "specification", "acquisition", "reception", and "control" in the following description represent the processes performed by the CPU 11. The processing by the CPU 11 also includes hardware control using the API of the OS 21. In this specification, the operation of each program will be described by omitting the detailed description of the OS 21. That is, in the following description, the description that "the program B controls the hardware C" may mean that "the program B controls the hardware C using the API of the OS 21". Further, the processing of the CPU 11 according to the command described in the program may be described in omitted wording. For example, a program may be omitted and described as "executed by the CPU 11". In addition, the processing of the CPU 11 according to the command described in the program may be described by the wording in which the CPU is omitted, such as "the program A performs".

Note that "acquisition" is used as a concept that a request is not essential. That is, the process of receiving data without the request of the CPU 11 is also included in the concept of "the CPU 11 acquires data". Further, "data" in the present specification is represented by a computer-readable bit string. Data having substantially the same meaning and different formats are treated as the same data. The same applies to "information" in this specification. Further, "request" and "instruct" are concepts indicating that information indicating that a request is being made and information indicating that an instruction is being made are output to the other party. Further, the information indicating that the request is being made and the information indicating that the instruction is being made are also simply referred to as "request" and "instruction".

In addition, the process of the CPU 11 of determining whether or not the information A indicates a matter B may be conceptually described as "to determine whether or not it is the matter B from the information A". The process of the CPU 11 of determining whether the information A indicates the matter B or a matter C may be conceptually described as "to determine whether it is the matter B or the matter C from the information A".

Figure 2:
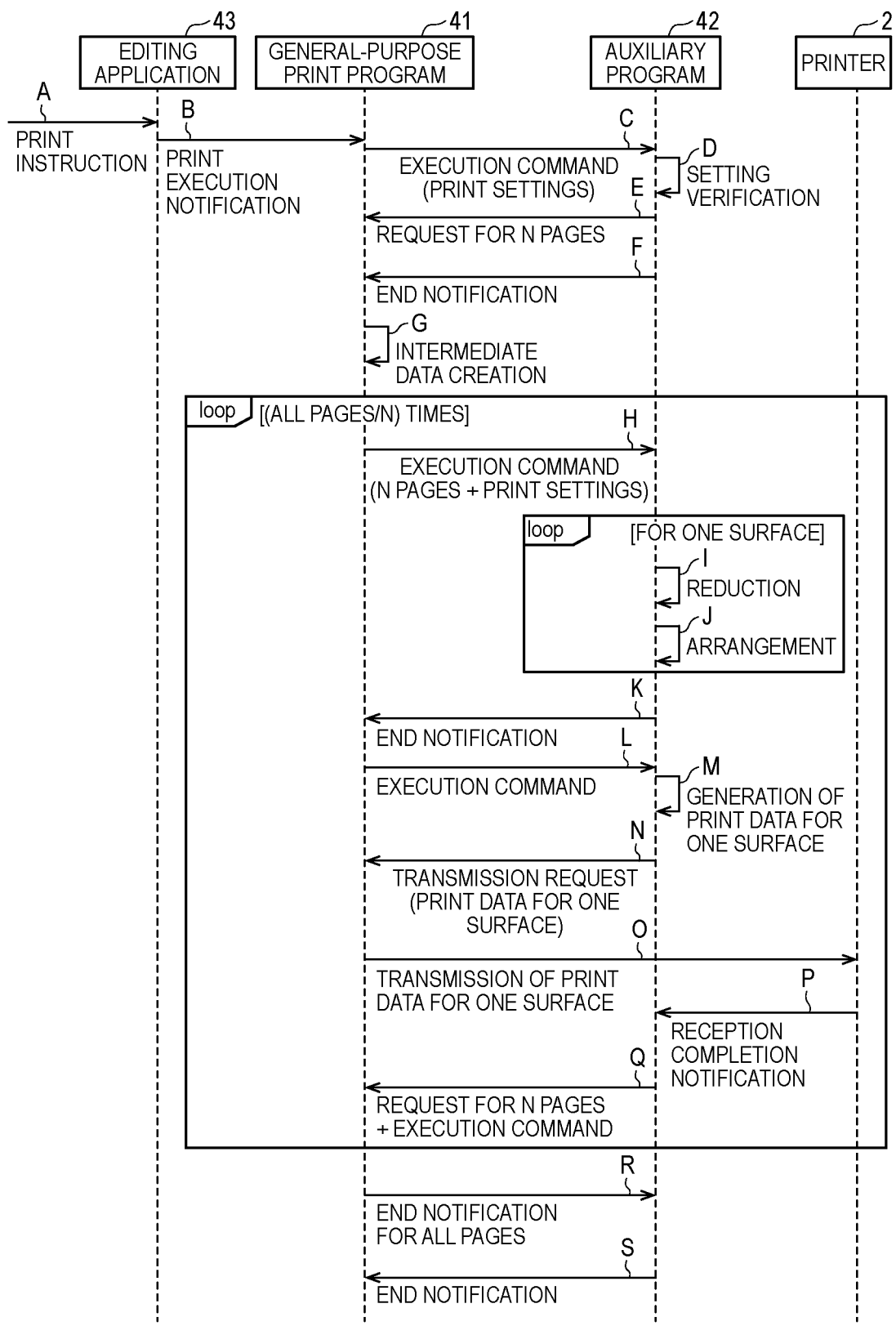
FIG. 2 is a sequence diagram illustrating an example of the order of operation of a first embodiment.

Next, the printing procedure including the operation of the auxiliary program 42 of the present embodiment will be described with reference to the sequence diagram of FIG. 2. The PC 1 of the present embodiment realize N up printing with the printer by using the auxiliary program 42. The N up printing is aggregate printing in which images for N pages of image data are reduced and arranged on one surface of one sheet and printed. N is a natural number of 2 or more. The general-purpose print program 41 of this embodiment may not support the print setting of N up printing. Further, the printer 2 of the present embodiment may not have the function of performing the N up printing process by its own device.

First, the editing application 43 receives the designation of an image to be printed and input of a print execution instruction via the UI 20 (arrow A). The editing application 43 receives an instruction to set a document edited by the editing application 43 or a photo read by the editing application 43 as an image to be printed. Then, the editing application 43 that has received the print instruction passes a print execution notification indicating the content of the received print instruction to the OS 21. In FIG. 2, the operation of the OS 21 is omitted.

When the OS 21 receives a print execution notification using the general-purpose print program 41, the OS 21 executes the general-purpose print program 41 and passes the print execution notification to the general-purpose print program 41 (arrow B). In the print execution notification, the general-purpose print program 41 may acquire various information included in the print instruction, for example, information indicating a printer to print, information indicating print settings set by the editing application 43, and information indicating image data to be printed.

The general-purpose print program 41 specifies the printer designated as the device that executes printing, based on the information included in the print execution notification. If the designated printer is the printer 2, since the auxiliary program 42 corresponding to the printer 2 is stored in the memory 12, the general-purpose print program 41 outputs the execution command of the processing of the auxiliary program 42 and cause the auxiliary program 42 to operate (arrow C). That is, when the general-purpose print program 41 detects the print execution notification, an execution command to the auxiliary program 42 is output from the general-purpose print program 41.

The auxiliary program 42 executes various processes based on the content of the execution command from the general-purpose print program 41. In the execution command of arrow C, the general-purpose print program 41 passes the print settings received by the editing application 43 to the auxiliary program 42 and requests the verification of the print settings.

The print settings based on the execution command of arrow C are verified by the auxiliary program 42 (arrow D). The auxiliary program 42 determines whether or not the received print settings are compatible with the functions of the printer 2, and the print settings are invalidated if the received print settings include a setting which is incompatible with the function of the printer 2, for example, a size of sheet not set in the printer 2 is selected.

The auxiliary program 42 of the present embodiment is configured to receive changes in print settings or additional settings during the execution of the process indicated by arrow D. In the following, a case where the auxiliary program 42 receives the setting for N up printing during the process of the arrow D will be described. That is, the print setting passed in arrow C does not include the N up printing setting, and the print setting at the end of the process of arrow D includes the N up printing setting. In addition to the N up printing setting, the auxiliary program 42 may receive an instruction of the arrangement order of images for N pages on one surface.

If the editing application 43 may receive the N up printing setting, the print setting passed to the auxiliary program 42 in arrow C may also include the N up printing setting. For example, in a case where the general-purpose print program 41 supports N up printing, the print setting including the N up printing setting may be passed in arrow C. Alternatively, even in a case where the general-purpose print program 41 does not support N up printing, for example, N up printing setting may be passed from the editing application 43 to the auxiliary program 42 via a storage area commonly used by the editing application 43 and the auxiliary program 42.

After the auxiliary program 42 finishes verifying the print settings, the auxiliary program 42 passes an end notification to the general-purpose print program 41. Since the setting of N up printing is included in the print setting, the auxiliary program 42 of the present embodiment passes the information for requesting the image data for N pages to the general-purpose print program 41 (arrow E) before the end notification, and then the end notification is passed (arrow F).

When the print setting received in arrow C includes the N up printing setting, the auxiliary program 42 invalidates the N up printing setting. Thus, the print setting passed from the auxiliary program 42 to the general-purpose print program 41 in arrow F does not include the N up printing setting. In the present embodiment, even if the general-purpose print program 41 supports N up printing, the general-purpose print program 41 does not perform the processing for N up printing.

The general-purpose print program 41 converts the format of the image data included in the print execution notification of arrow B into the format of the intermediate data to create intermediate data in response to receiving the end notification indicating the end of print setting verification from the auxiliary program 42, and a print job including the intermediate data is generated (arrow G). The image data designated in the editing application 43 is of various types and the general-purpose print program 41 converts the received image data into intermediate data suitable for generating print data. If the image data included in the print execution notification is data suitable for generating print data, the generation of intermediate data may be omitted and the image data may be used as the intermediate data as it is. The intermediate data is, for example, XPS data.

Further, in response to the request received in arrow E, the general-purpose print program 41 passes the intermediate data for N pages and print settings to the auxiliary program 42 in order from the first page of the generated intermediate data and outputs an execution command of the processing of the auxiliary program 42 to cause the auxiliary program 42 to operated (arrow H). By the process of arrow H, the auxiliary program 42 receives the intermediate data. The process of arrow H is an example of the image data receiving process. The auxiliary program 42 receives images in units of N pages so that the auxiliary program 42 has less interaction with the general-purpose print program 41 and the processes of the auxiliary program 42 are simple as compared with the case of receiving images page by page.

The auxiliary program 42 generates intermediate data in which each image is reduced based on the received intermediate data for N pages (arrow I), arranges the reduced intermediate data at an appropriate position for N up printing, and composes the data (arrow J). The process of arrow J is an example of the composition process. The auxiliary program 42 repeats arrow I and arrow J N times to generate intermediate data for one surface of the sheet.

For example, if N is 4, the auxiliary program 42 reduces the intermediate data for four pages so that each side has a ½ size, and the reduced four intermediate data are arranged at four locations in one surface and compose the data to generate one intermediate data. The reduction and the arrangement may be reversed. The auxiliary program 42 rotates the image by 90 degrees or 270 degrees as necessary at the time of arrangement. When the generation of the intermediate data for one surface of the sheet is completed, the auxiliary program 42 passes an end notification to the general-purpose print program 41 (arrow K).

Upon receiving the end notification from the auxiliary program 42, the general-purpose print program 41 passes an execution command to the auxiliary program 42 (arrow L). The execution command of arrow L is a command for requesting the generation of print data based on the generated intermediate data. The auxiliary program 42 generates print data for one surface of the sheet using the generated intermediate data for one surface of the sheet (arrow M). The process of arrow M is an example of a first rasterizing process. The process of arrow K and the process of arrow L may be omitted depending on the agreement between the general-purpose print program 41 and the auxiliary program 42.

In arrow M, the auxiliary program 42 rasterizes the intermediate data to generate print data. The print data generated in arrow M is data in a format that is able to be used for printing on the printer 2, and is, for example, PDL data dedicated to the model of the printer 2. By rasterizing the intermediate with the auxiliary program 42, the degree of freedom is greater than in the case of rasterizing the intermediate data with the general-purpose print program 41, and print data suitable for printing with the printer 2 is likely to be generated. The print data generated by arrow M may be data in a format that is able to be used for printing on a printer other than the model of the printer 2.

The intermediate data may be passed from the auxiliary program 42 to the general-purpose print program 41 once together with the end notification of arrow K and then may be passed from the general-purpose print program 41 to the auxiliary program 42. Instead of that, the intermediate data may be stored in the auxiliary program 42 after the end notification of arrow K to be used for generating print data in the auxiliary program 42.

The auxiliary program 42 passes the generated print data for one surface of the sheet and a transmission request of the print data from the printer 2 to the general-purpose print program 41 (arrow N). Based on the request of arrow N, the general-purpose print program 41 transmits the received print data and a print command to the printer 2 (arrow O). Since the print data is transmitted to the printer 2 based on the process of arrow N, the process of arrow N is an example of the output process. As a result, the printer 2 that has received the print command prints an image of the print data according to the print data attached to the print command. By transmitting to the printer 2 each time the print data for one surface of the sheet is generated, the waiting time until starting printing the first sheet becomes shorter as compared with the case where the generation of the print data for all pages is waited and then transmitted.

Since the general-purpose print program 41 does not include the N up printing setting in the print setting received in arrow F, the print setting that does not include the N up printing setting is added and transmitted when the print data is transmitted in arrow O. As a result, even if the printer 2 is a device capable of performing N up printing processing in its own device, there is no possibility that further N-in-1 processing is performed in the printer 2.

The auxiliary program 42, for example, passes a transmission request of arrow N to the general-purpose print program 41, and then periodically transmits a signal inquiring the printer 2 about the status. The printer 2 informs the auxiliary program 42 of the status in response to the inquiry, and when the reception of the print data is completed, the printer 2 transmits a reception completion notification indicating that the reception has been completed to the auxiliary program 42 (arrow P). The reception completion notification is a notification indicating that the reception has been completed, and the printing may not be completed. The reception completion notification may be passed to the auxiliary program 42 via the general-purpose print program 41.

Upon receiving the reception completion notification transmitted from the printer 2, the auxiliary program 42 requests the general-purpose print program 41 to transmit the intermediate data for the next N pages and an execution command of the auxiliary program 42 (arrow Q). As a result, the general-purpose print program 41 passes the execution command of arrow H to the auxiliary program 42 together with the intermediate data for the next N pages. In the second and subsequent arrow H, the general-purpose print program 41 may pass an execution command that does not include print settings.

When the number of remaining pages among the images designated by the print instruction is 1 or more and less than N, the general-purpose print program 41 passes, to the auxiliary program 42, the information indicating the number of remaining pages and the intermediate data for the remaining pages in the execution command of arrow H. Alternatively, the general-purpose print program 41 may pass the information indicating that it is the final page of the image. The auxiliary program 42 performs the image reduction (arrow I) and arrangement (arrow J) on the remaining pages as described above and fill an area corresponding to page(s) from next page of the final page to N page with blank images and composes the data.

When the general-purpose print program 41 receives a request for an execution command in arrow Q after passing all the intermediate data that is the target of the print instruction to the auxiliary program 42, the general-purpose print program 41 passes information indicating that all the intermediate data have been passed, to the auxiliary program 42 (arrow R). The information passed in arrow R may be, for example, an execution command to which intermediate data is not attached. Upon receiving the information of arrow R, the auxiliary program 42 passes an end notification to the general-purpose print program 41 (arrow S). As a result, the general-purpose print program 41 ends the print execution notification process received in arrow B from the editing application 43.

In a case where the auxiliary program 42 is a combination of a plurality of programs and each program needs to issue an end notification, the general-purpose print program 41 may issue a notification of arrow R to each program. Then, each program of the auxiliary program 42 may perform a notification of arrow S to the general-purpose print program 41.

As described above in detail, according to the auxiliary program 42 of the present embodiment, in the case of receiving the print instruction including the print setting of N up printing, the PC 1 receives the intermediate data for every N pages from the general-purpose print program 41 and the auxiliary program 42 reduces and arranges the images to generate composite images in which the images for N pages fit on one surface of the sheet. As a result, even if the general-purpose print program 41 or the printer 2 does not support N up printing, it is possible to obtain a printed matter by N up printing. Further, since the print data is generated by the auxiliary program 42, the print data may be generated by utilizing the performance of the printer 2. Since the print data for one surface at a time is transmitted, it is possible to shorten the elapsed time until the first sheet of the printed matter is output after receiving the print instruction.

Figure 3:
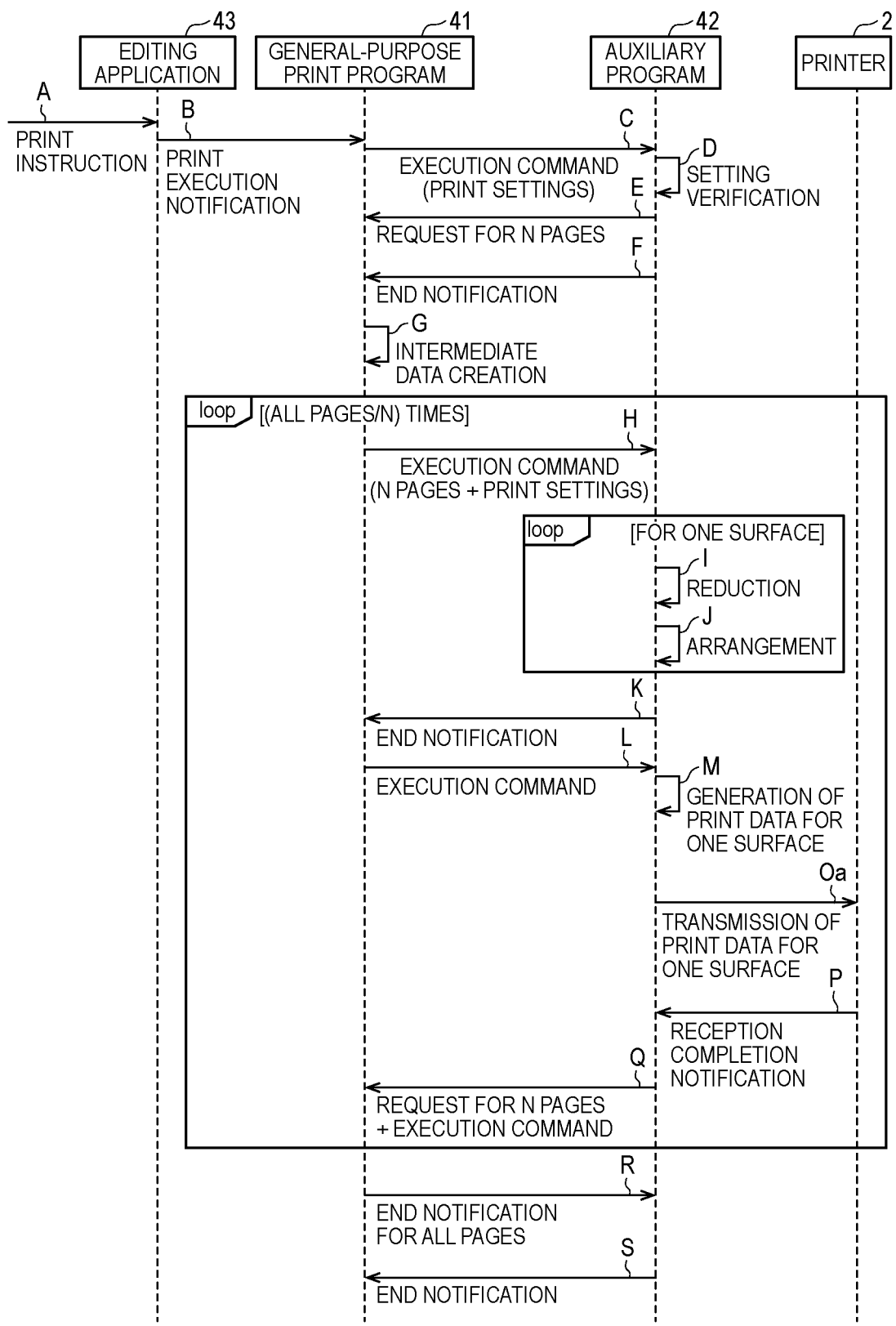
FIG. 3 is a sequence diagram illustrating another example of the order of operation of the first embodiment.

In the first embodiment, the auxiliary program 42 passes the print data and the transmission request to the general-purpose print program 41 in arrow N, and the general-purpose print program 41 transmits the print data to the printer 2. However, for example, as shown in FIG. 3, the auxiliary program 42 may transmit the print data to the printer 2. That is, instead of arrow N and arrow O in FIG. 2, in the example of FIG. 3, when the print data generation is completed, the auxiliary program 42 transmits the generated print data for one surface to the printer 2 (arrow Oa). The process of arrow Oa is an example of the output process. Even in this case, since the print data for one surface is transmitted each time the print data is generated, the elapsed time until the printing of the first sheet is short.

As shown in FIG. 3, when the auxiliary program 42 transmits print data to the printer 2, the auxiliary program 42 does not need to periodically transmit a signal to inquire the printer 2 about the status, but only to make an inquiry once after the end of the transmission. Further, after transmitting the print data, the auxiliary program 42 may receive not only the information regarding the success or failure of the transmission of the print data but also the information regarding the status of the printer 2 and pass the information to the OS 21.

Figure 4:
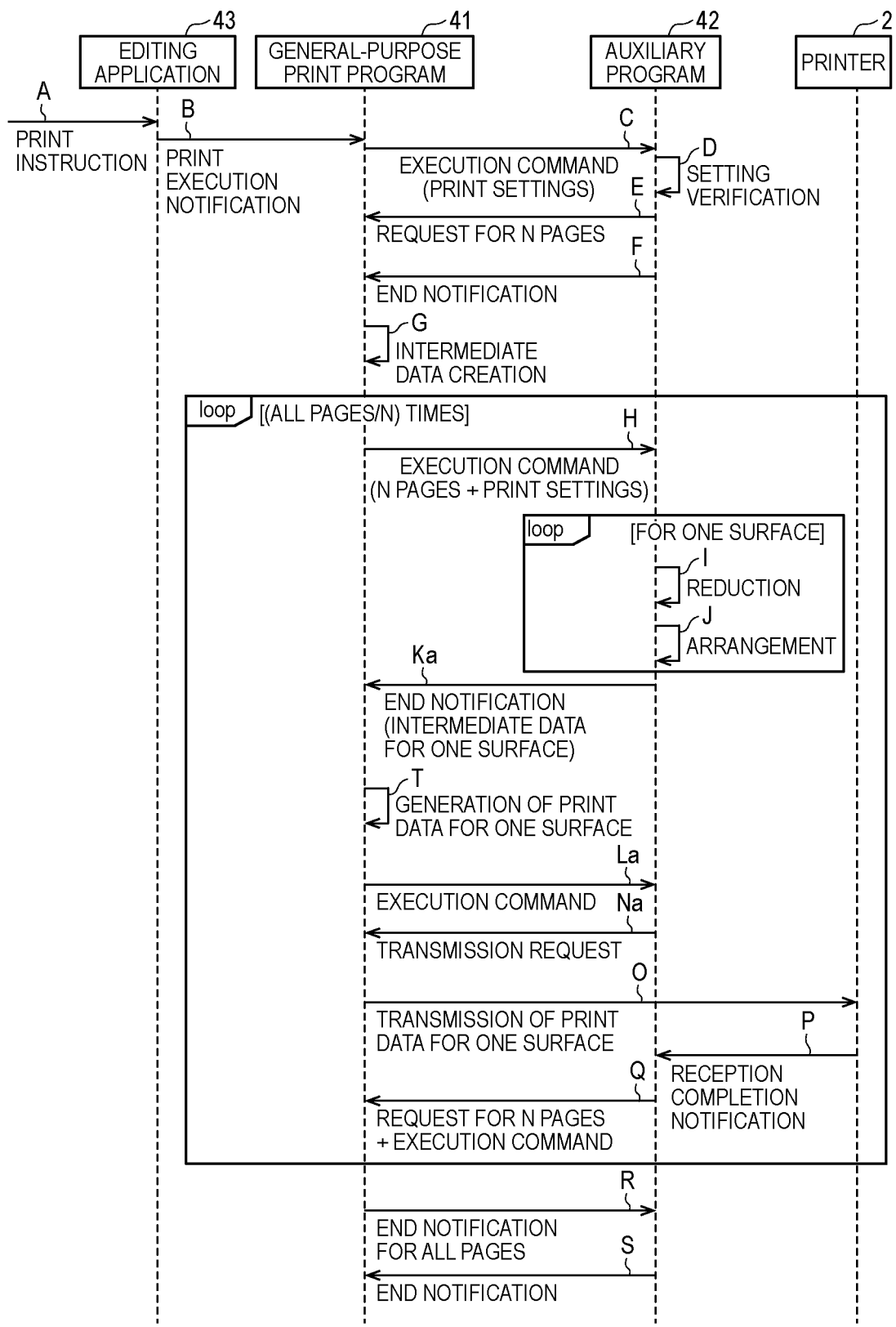
FIG. 4 is a sequence diagram illustrating another example of the order of operation of the first embodiment.

Further, the generation of the print data may be performed by the general-purpose print program 41. For example, as shown in FIG. 4, the intermediate data after the composition is passed to the general-purpose print program 41 by an end notification (arrow Ka), and the print data may be generated based on the intermediate data received by the general-purpose print program 41 instead of arrow L and arrow M in FIG. 2 (arrow T). The process of arrow T is different from the process of arrow M in FIG. 2. The print data generated by the general-purpose print program 41 is data in a format that is compatible with various printers including the printer 2, and is, for example, PWGRaster data or PDF data. If rasterization is performed by the general-purpose print program 41, the amount of processing by the auxiliary program 42 is small and the design burden of the auxiliary program 42 is reducible.

In the example of FIG. 4, the general-purpose print program 41 further passes an execution command to the auxiliary program 42 (arrow La) after the generation of print data is completed. Upon receiving the execution command, the auxiliary program 42 passes a transmission request to the general-purpose print program 41 (arrow Na) and the general-purpose print program 41 transmits the generated print data to the printer 2 (arrow O). Unlike arrow N in FIG. 2, in the transmission request of arrow Na, the auxiliary program 42 does not pass the print data. Even in this case, the N up printing with the printer is realized.

Figure 5:
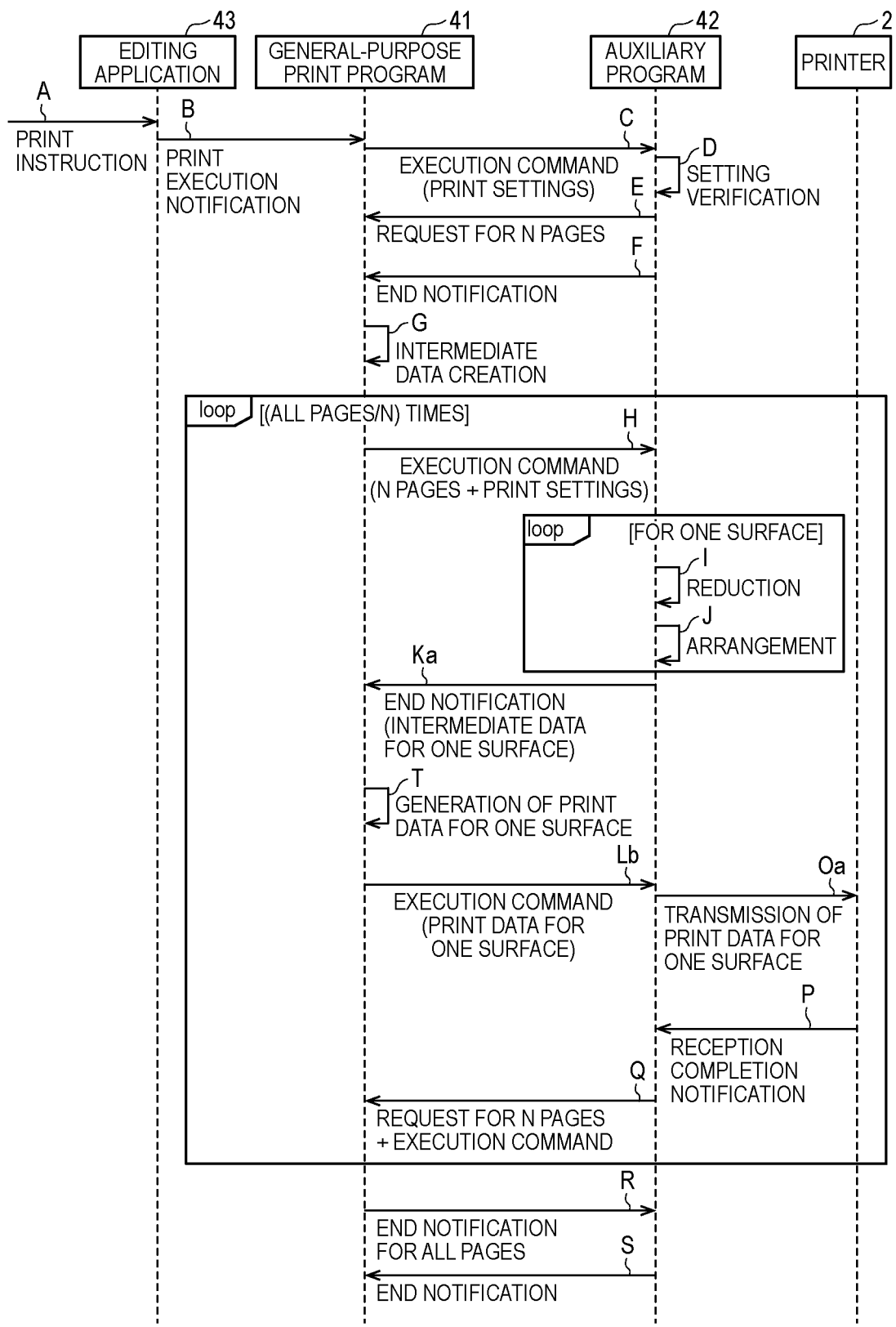
FIG. 5 is a sequence diagram illustrating another example of the order of operation of the first embodiment.

Further, the generation of print data may be performed by the general-purpose print program 41 and the auxiliary program 42 may transmit the print data to the printer 2. For example, as shown in FIG. 5, the general-purpose print program 41 may pass an execution command and the generated print data for one surface to the auxiliary program 42 (arrow Lb) when the generation of print data is completed. In this case, instead of arrow Na and arrow O in FIG. 4, the auxiliary program 42 transmits the received print data for one surface to the printer 2 (arrow Oa). Even in this case, the N up printing with the printer 2 is realized.

Figure 6:
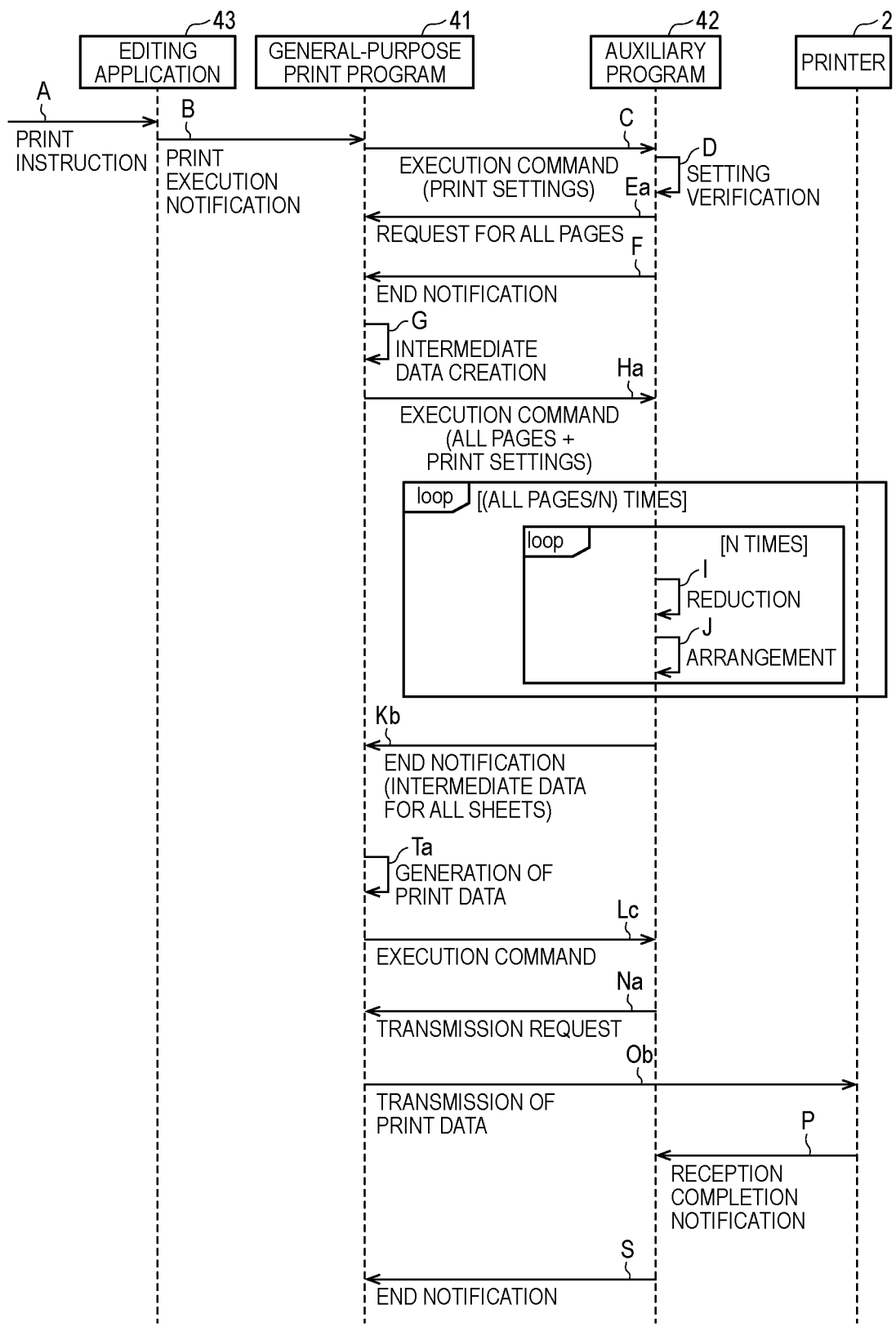
FIG. 6 is a sequence diagram illustrating an example of the order of operation of a second embodiment.

Next, the printing procedure including the operation of the auxiliary program 42 of a second embodiment will be described with reference to the sequence diagrams of FIG. 6. This embodiment is different from the first embodiment in the procedure of the generation and transmission of print data. In FIG. 6 and the following description, the same processes as those in the first embodiment are designated by the same reference numerals and the description thereof will be omitted. Further, the processes similar to but different from those of the first embodiment will use the reference numerals with lower case letters to describe the difference from the first embodiment.

In this embodiment, first, the processes of arrow A to arrow G are executed. However, the auxiliary program 42 of the present embodiment performs a notification (arrow Ea) requesting image data of all pages to be printed, instead of the notification (arrow E in FIG. 2) requesting image data for N pages. Then, the general-purpose print program 41 generates the intermediate data (arrow G), and then attaches the intermediate data of all pages and the print settings and passes an execution command to the auxiliary program 42 (arrow Ha). By the process of arrow Ha, the auxiliary program 42 receives the intermediate data. The process of arrow Ha is an example of the image data receiving process.

The auxiliary program 42 performs the image reduction (arrow I) and arrangement (arrow J) for every N pages from the first page on the received intermediate data for all pages and generates intermediate data for one surface of the sheet. The auxiliary program 42 repeatedly performs the process of generating intermediate data composed by the reduction and arrangement to generate intermediate data for all sheets based on the received intermediate data for all pages. Also, in the present embodiment, the process of arrow J is an example of the composition process.

When the generation of the intermediate data for all sheets is completed, the auxiliary program 42 passes an end notification to the general-purpose print program 41 (arrow Kb). In the end notification of arrow Kb, the auxiliary program 42 passes the generated intermediate data for all sheets to the general-purpose print program 41. Upon receiving the end notification of arrow Kb, the general-purpose print program 41 generates print data for all sheets based on the received intermediate data (arrow Ta).

When the generation of print data is completed, the general-purpose print program 41 passes an execution command to the auxiliary program 42 (arrow Lc). The execution command of arrow Lc is information for notifying that the generation of print data for all sheets has been completed and is information for requesting the next transmission request (arrow Na). Upon receiving the execution command of arrow Lc, the auxiliary program 42 passes a transmission request in which the printer 2 is the transmission destination (arrow Na). In the transmission request of arrow Na, the auxiliary program 42 does not pass the print data. Further, when the generation and transmission of print data is collectively requested by the end notification of arrow Kb, the processes of arrow Lc and arrow Na may be omitted.

Upon receiving the transmission request of arrow Na, the general-purpose print program 41 transmits the print data for all sheets generated in arrow Ta to the printer 2 (arrow Ob). The process of arrow Ob is an example of the output process. In this embodiment, since the print data for images of all pages is generated and then transmitted, it is easier to grasp the final page as compared with the first embodiment in which the print data is transmitted each time print data for one surface is generated. Since the number of times of communication with the printer 2 is small, the processes become simple.

Upon receiving the print data, the printer 2 transmits a notification indicating that the reception has been completed to the auxiliary program 42 (arrow P). Upon receiving the notification of arrow P, the auxiliary program 42 passes an end notification to the general-purpose print program 41 (arrow S). In this embodiment, the notifications of arrow P and arrow S may be omitted.

As described above in detail, according to the auxiliary program 42 of the present embodiment, when the PC 1 receives the print instruction including the print setting of N up printing, the auxiliary program 42 receives the intermediate data for all pages from the general-purpose print program 41, generates intermediate data for all sheets, and passes the generated intermediate data to the general-purpose print program 41. As a result, even if the general-purpose print program 41 or the printer 2 does not support N up printing, it is possible to obtain a printed matter by N up printing. Further, the auxiliary program 42 of the present embodiment collectively receives all the images of a plurality of pages to be printed and responds to the general-purpose print program 41 after the generation of the composite image for the images of all pages is completed. Therefore, there is less interaction with the general-purpose print program 41 and the processes become simple.

Figure 7:
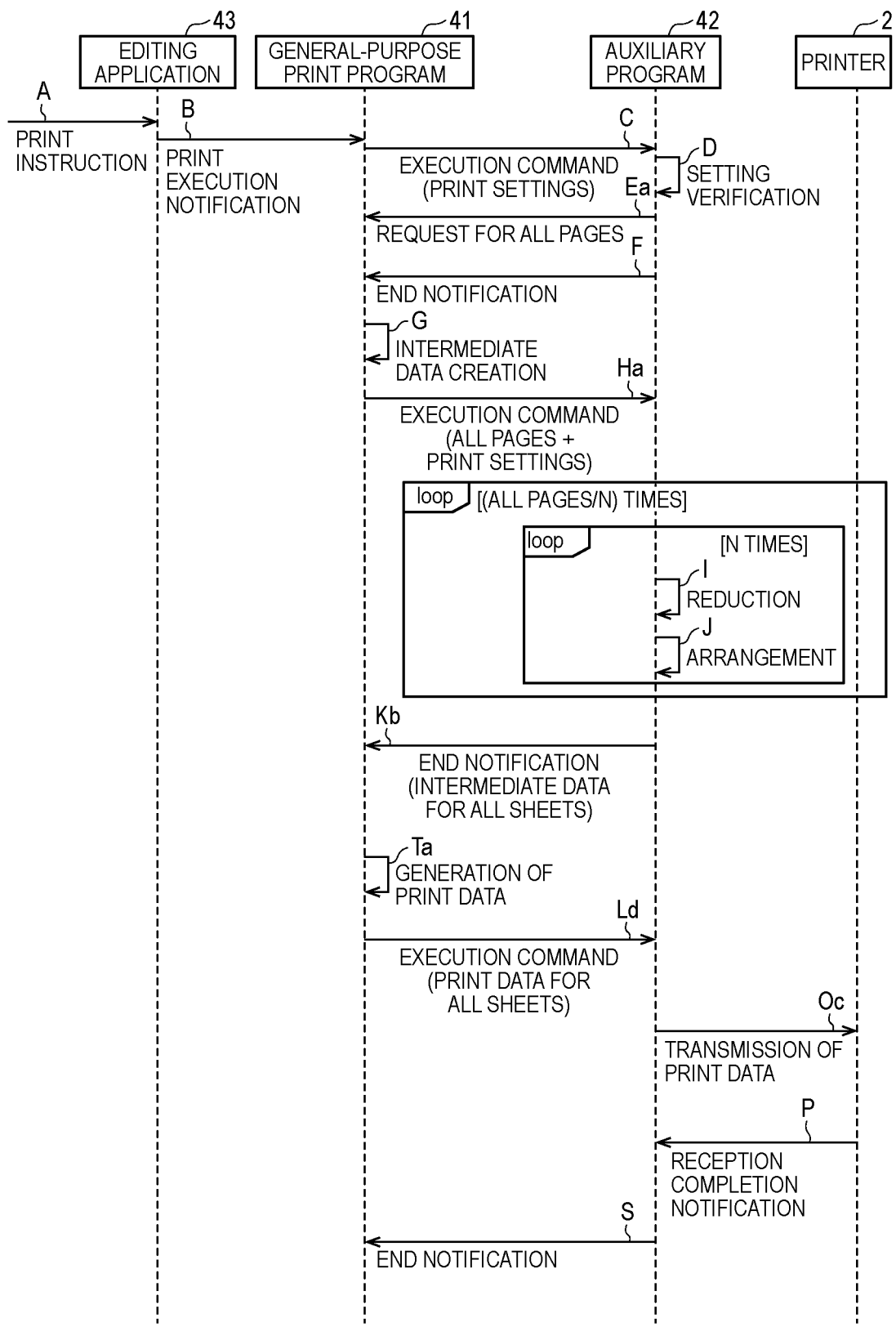
FIG. 7 is a sequence diagram illustrating another example of the order of operation of the second embodiment.

Also in this embodiment, as in the first embodiment, there are a plurality of variations. For example, as shown in FIG. 7, the auxiliary program 42 may transmit the print data. When the generation of print data is completed in arrow Ta, the general-purpose print program 41 passes an execution command including the generated print data for all sheets to the auxiliary program 42 (arrow Ld). The auxiliary program 42 transmits the received print data to the printer 2 (arrow Oc). The process of arrow Oc is an example of the output process. Even in this case, the number of times of communication with the printer 2 is small because the print data for the images of all pages is generated and then transmitted.

Figure 8:
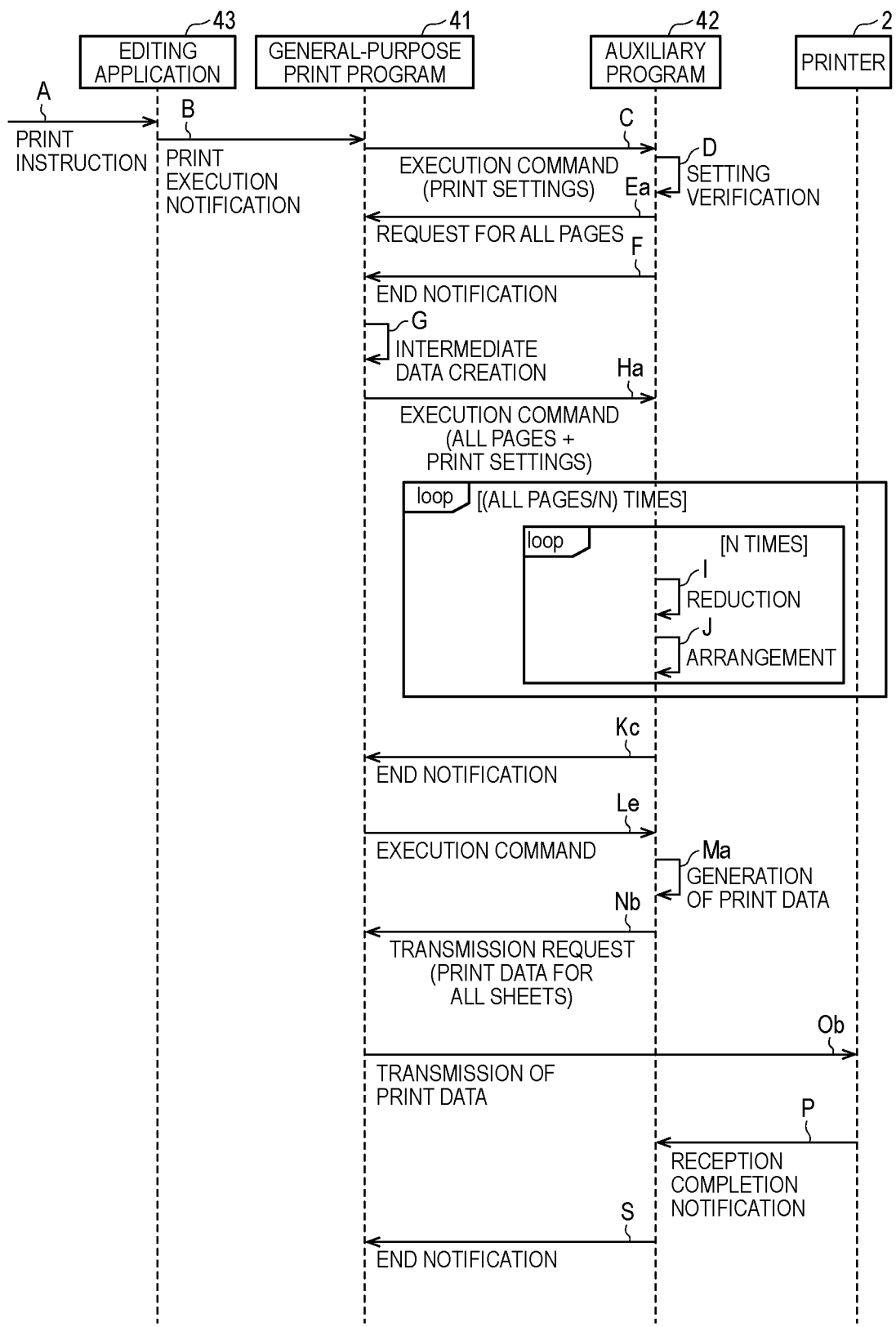
FIG. 8 is a sequence diagram illustrating another example of the order of operation of the second embodiment.

Further, the auxiliary program 42 may generate the print data. For example, as shown in FIG. 8, after generating the composite image, the auxiliary program 42 passes an end notification that does not include the composite intermediate data (arrow Kc). Upon receiving the end notification of arrow Kc, the general-purpose print program 41 passes an execution command to the auxiliary program 42 (arrow Le). Upon receiving the execution command of arrow Le, the auxiliary program 42 generates print data for all sheets based on the generated intermediate data for all sheets (arrow Ma). The process of arrow Ma is an example of a second rasterizing process.

Then, the auxiliary program 42 passes a transmission request together with the generated print data for all sheets to the general-purpose print program 41 (arrow Nb) and the general-purpose print program 41 transmits the print data for all sheets to the printer 2 (arrow Ob). In this way, since the auxiliary program 42 performs rasterizing, print data suitable for the printer 2 is generated.

Figure 9:
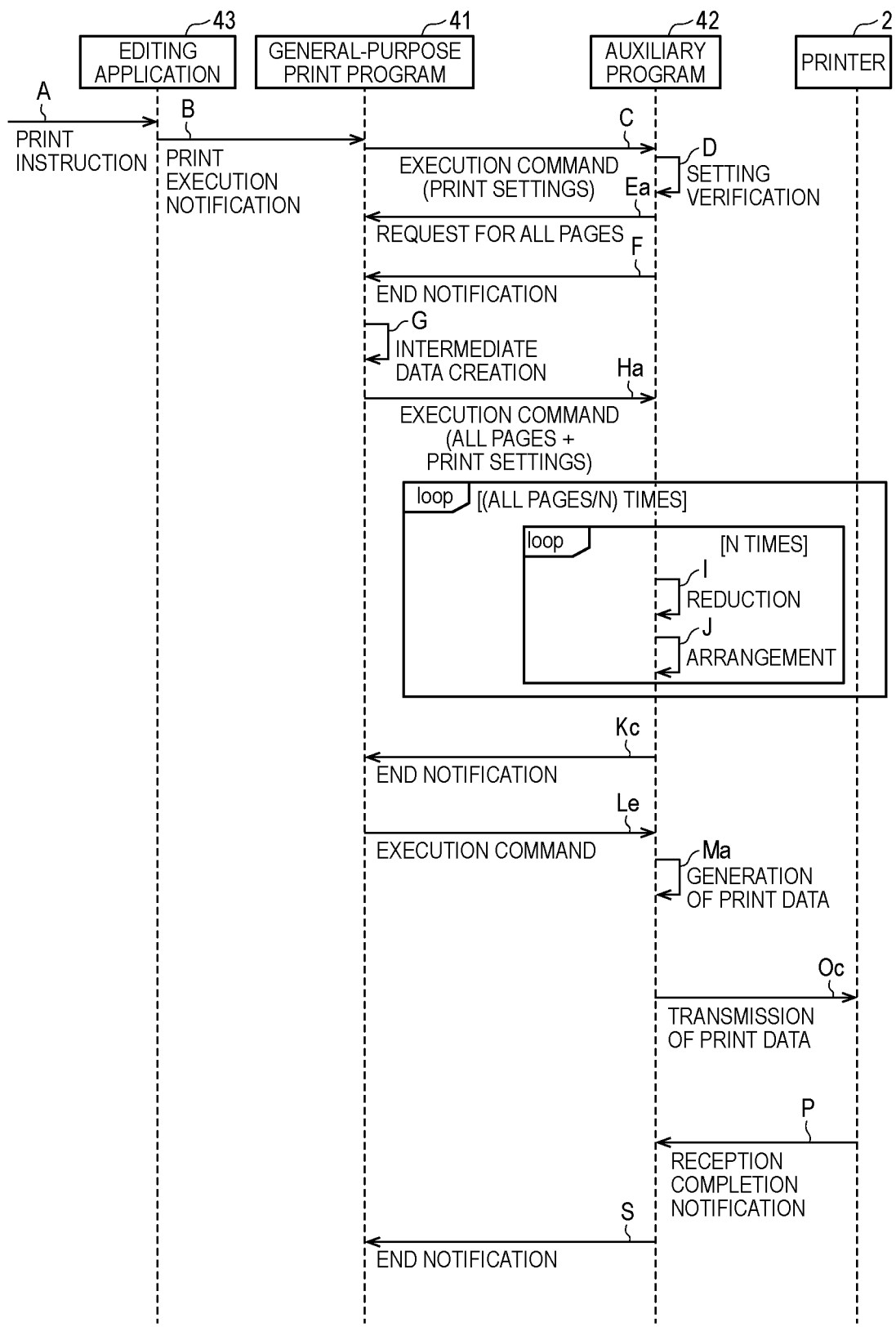
FIG. 9 is a sequence diagram illustrating another example of the order of operation of the second embodiment.

Further, the auxiliary program 42 may perform the generation of print data and the transmission to the printer 2. For example, as shown in FIG. 9, upon receiving the end notification of arrow Kc, the general-purpose print program 41 passes an execution command to the auxiliary program 42 (arrow Le). Upon receiving the execution instruction of arrow Le, the auxiliary program 42 generates print data for all sheets (arrow Ma). Further, the auxiliary program 42 transmits the generated print data to the printer 2 (arrow Oc). In this way, print data suitable for the printer 2 is generated and the number of times of communication becomes small.

Figure 10:
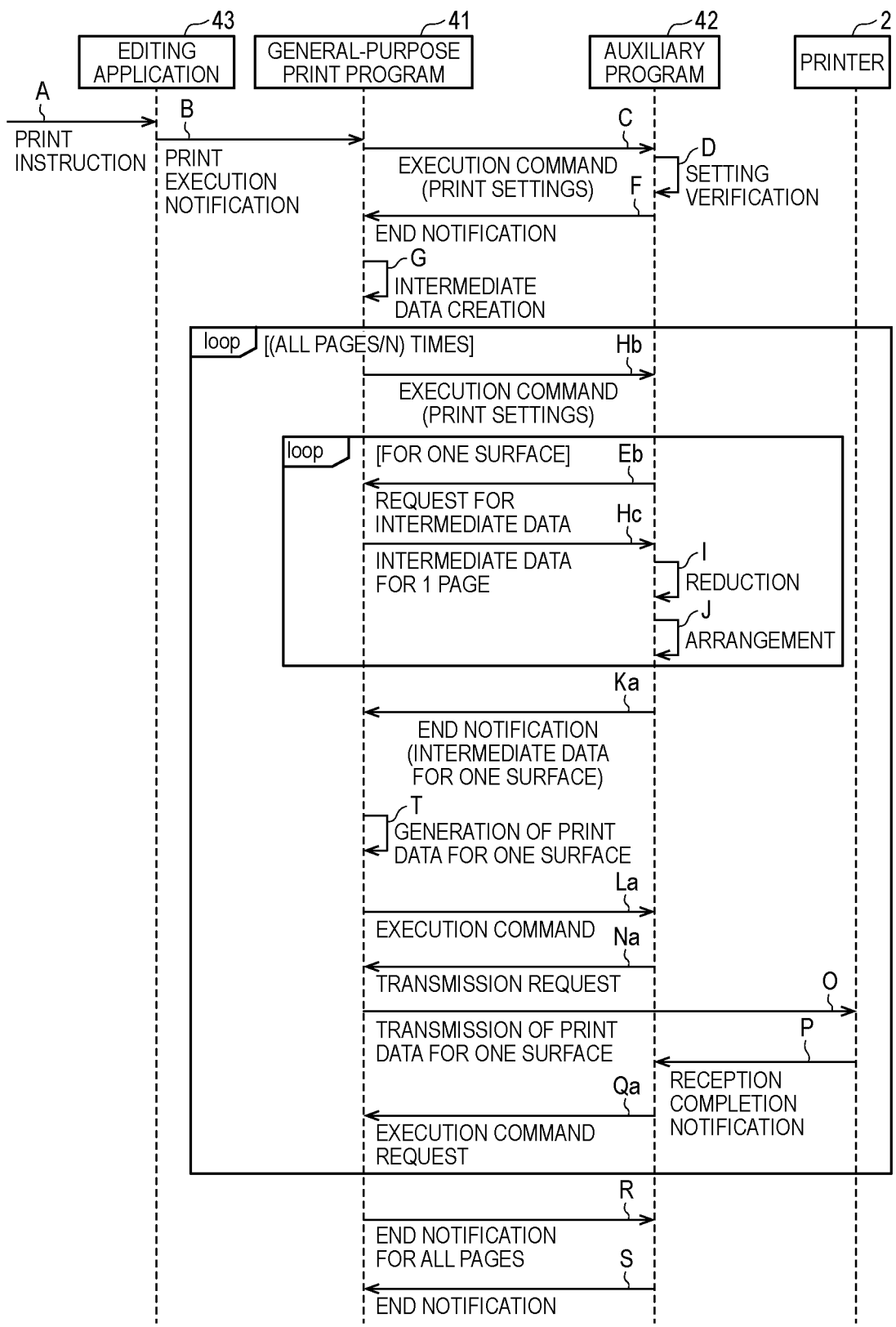
FIG. 10 is a sequence diagram illustrating an example of the order of operation of a third embodiment.

Next, the printing procedure including the operation of the auxiliary program 42 of a third embodiment will be described with reference to the sequence diagrams of FIG. 10. This embodiment is different from the first and second embodiments in the generation procedure of print data. In FIG. 10 and the following description, the same processes as those in the first embodiment are designated by the same reference numerals and the description thereof will be omitted. Further, the processes similar to but different from those of the first and second embodiments will use the reference numerals with lower case letters to describe the difference from the respective embodiments.

In this embodiment, first, the processes of arrow A to arrow G are executed. However, the auxiliary program 42 of this embodiment does not perform a notification (arrow E in FIG. 2) requesting image data for N pages. Then, the general-purpose print program 41 passes an execution command and the print setting to the auxiliary program 42 (arrow Hb), after generating the intermediate data. Since the request for the intermediate data is not made, the execution command of arrow Hb does not attach the intermediate data unlike arrow H of the first embodiment and arrow Ha of the second embodiment.

Upon receiving the execution command of arrow Hb, the auxiliary program 42 first requests intermediate data for one page to the general-purpose print program 41 (arrow Eb). The general-purpose print program 41 passes the intermediate data for one page in response to the request from the auxiliary program 42 (arrow Hc). By the process of arrow Hc, the auxiliary program 42 receives the intermediate data. The process of arrow Hc is an example of the image data receiving process. If the general-purpose print program 41 is configured to pass the intermediate data for each page without receiving a request, the request of arrow Eb may not be made.

The auxiliary program 42 reduces the image of the received intermediate data for one page (arrow I), arranges the image at an appropriate position, and compose the image (arrow J). The auxiliary program 42 repeats the processes of arrow Eb, arrow Hc, arrow I, and arrow J N times to generate intermediate data for one surface of the sheet. After this, as in the first embodiment, there are four types of methods. In FIG. 10, as shown in FIG. 4 of the first embodiment, the general-purpose print program 41 performs the generation and transmission of print data (arrow Ka to arrow P). As described in the first embodiment, the auxiliary program 42 may perform at least one of generation and transmission of print data.

Upon receiving the reception completion notification transmitted from the printer 2, the auxiliary program 42 requests the general-purpose print program 41 to transmit an execution command of the auxiliary program 42 (arrow Qa). In the present embodiment, the auxiliary program 42 does not request the intermediate data in arrow Qa.

When the general-purpose print program 41 receives a request for an execution command by arrow Qa after passing all the intermediate data to the auxiliary program 42, the general-purpose print program 41 passes information indicating that all the intermediate data have been passed to the auxiliary program 42 (arrow R). Upon receiving the information of arrow R, the auxiliary program 42 passes an end notification to the general-purpose print program 41 (arrow S). As a result, the general-purpose print program 41 ends the print execution notification process received by arrow B from the editing application 43.

As described above in detail, it is possible to obtain the printed matter by N up printing also by the auxiliary program 42 of the third form. According to the present embodiment, even when the general-purpose print program 41 is configured to pass the intermediate data for each page to the auxiliary program 42 and does not receive the request for collectively passing N pages or all pages, N up printing is realized. Furthermore, if the general-purpose print program 41 generates print data, the auxiliary program 42 becomes simple. If the print data is transmitted to the printer 2 for each page, the elapsed time until the first sheet of the printed matter is output after receiving the print instruction is shortened.

The embodiments disclosed in the present specification are merely examples and do not limit the present invention. Therefore, the technology disclosed in the present specification may be variously modified and changed without departing from the gist of the invention. For example, the device connected to the PC 1 is not limited to the printer and may be any other device having a printing function including a multifunction peripheral, a copying machine, a FAX device, and the like. Further, the number of printers connected to the PC 1 may be two or more.

Further, in the above-described embodiments, only the processing related to N up printing is described as the operation of the auxiliary program 42 but the auxiliary program 42 may have another role. For example, for print settings other than N up printing, the general-purpose print program 41 may perform processing for the print settings that may be processed by the general-purpose print program 41, and the auxiliary program 42 may perform processing for the print settings that cannot be processed by the general-purpose print program 41.

Further, the auxiliary program 42 may be a program that receives an instruction from the OS 21 or the general-purpose print program 41 when performing printing using the general-purpose print program 41. For example, a print workflow application (Print Workflow) published by Microsoft Corporation may be used.

Further, in the above-described embodiments, the auxiliary program 42 is executed by outputting an execution command from the general-purpose print program 41 to the auxiliary program 42, but the execution timing of the auxiliary program 42 is not limited thereto. For example, the execution command may be directly received from the OS 21 and executed, or the resident auxiliary program 42 may be used. When resident, the auxiliary program 42 may receive an execution command and perform the above-described operation.

Further, in any flowchart disclosed in the embodiments, the plurality of processes in any of the plurality of steps may be arbitrarily changed in execution order or executed in parallel within a range in which there is no contradiction in processing contents.

Further, the processing disclosed in the embodiments may be executed by hardware including a single CPU, a plurality of CPUs, or ASIC, or a combination thereof. Further, the processing disclosed in the embodiments may be realized in various modes including a recording medium recording a program for executing the processing, a method, or the like.

What is claimed is:

1. A non-transitory computer readable medium storing a support program causing a computer installed in an information processing device to execute a process corresponding to a printer connected to the information processing device, the process comprising:

in a case where a print instruction output from an application program installed in the information processing device and causing the printer to print images is sent to a driverless general-purpose print program pre-installed in an operating system of the information processing device, and in a job based on the print instruction, the printer is caused to execute aggregate printing in which images for N pages are printed on one surface of a sheet, N being a natural number of 2 or more, receiving image data for images of a plurality of pages from the driverless general-purpose print program;

generating composite image data corresponding to composite image which is generated by reducing images of the plurality of pages in size and arranging the reduced images for the N pages so that the reduced images fit on one surface of the sheet, from the image data received in the receiving of the image data; and causing the information processing device to transmit print data which is rasterized based on the composite image data to the printer.

2. The non-transitory computer readable medium according to claim 1, wherein the process further comprises rasterizing the generated composite image data to generate the print data each time the composite image data for one surface of the sheet is generated by the generating, and in the transmitting of the print data by the information processing device, the generated print data for one surface of the sheet is transmitted to the printer each time the print data for one surface of the sheet is generated by the rasterizing.

3. The non-transitory computer readable medium according to claim 2, wherein in the receiving of the image data from the driverless general-purpose print program, the driverless general-purpose print program is requested to input image data for images for each N pages, and the image data is received from the driverless general-purpose print program each N pages.

4. The non-transitory computer readable medium according to claim 1, wherein the process further comprises rasterizing the generated composite image data to generate the print data each time the composite image data for one surface of the sheet is generated by the generating, and in the transmitting of the print data by the information processing device, the generated print data for one surface of the sheet is passed to the driverless general-purpose print program each time the print data for one surface of the sheet is generated by the rasterizing process and then the driverless general-purpose print program transmits the passed print data to the printer.

5. The non-transitory computer readable medium according to claim 1, wherein in the transmitting of the print data by the information processing device, the generated composite image data is passed to the driverless general-purpose print program each time the composite image data for one surface of the sheet is generated by the generating, and the driverless general-purpose print program rasterizes the passed composite image data to generate the print data and transmits the generated print data to the printer.

6. The non-transitory computer readable medium according to claim 1, wherein in the transmitting of the print data by the information processing device, the generated composite image data is passed to the driverless general-purpose print program each time the composite image data for one surface of the sheet is generated by the generating, the print data which is generated by rasterizing the composite image data with the driverless general-purpose print program is received, and the received print data is transmitted to the printer.

7. The non-transitory computer readable medium according to claim 1, wherein in the transmitting of the print data by the information processing device, the composite image data for the images of the plurality of pages which is generated by the generating is acquired, the acquired composite image data for the images of the plurality of pages is passed to the driverless general-purpose print program, the driverless general-purpose print program generates the print data by rasterizing the passed composite image data for the images of the plurality of pages, and after the generation of the print data for the images of the plurality of pages is completed, the generated print data for the images of the plurality of pages is transmitted to the printer.

8. The non-transitory computer readable medium according to claim 7, wherein in the receiving of the image data from the driverless general-purpose print program, the driverless general-purpose print program is requested to input image data for all the images of the plurality of pages, and the transmitting of the print data is executed after the generation of the composite image data for all the images is completed in the generating of the composition image data.

9. The non-transitory computer readable medium according to claim 1, wherein in the transmitting of the print data by the information processing device, the composite image data for the images of the plurality of pages which is generated by the generating is acquired, the acquired composite image data for the images of the plurality of pages is passed to the driverless general-purpose print program, further, the print data which is generated by rasterizing the composite image data with the driverless general-purpose print program is received, and after the print data for the images of the plurality of pages is received, the received print data for the images of the plurality of pages is transmitted to the printer.

10. The non-transitory computer readable medium according to claim 1, wherein the process further comprises:

acquiring the composite image data for the images of the plurality of pages generated by the generating; and rasterizing the acquired composite image data to generate the print data for the images of the plurality of pages, and in the transmitting of the print data by the information processing device, after the generation of the print data for the images of the plurality of pages is completed in the rasterizing, the generated print data for the images of the plurality of pages is transmitted to the printer.

11. The non-transitory computer readable medium according to claim 1, wherein the process further comprises:

acquiring the composite image data for the images of the plurality of pages generated by the generating; and rasterizing the acquired composite image data to generate the print data for the images of the plurality of pages, and in the transmitting of the print data by the information processing apparatus, after the generation of the print data for the images of the plurality of pages is completed in the rasterizing, the generated print data for the images of the plurality of pages is passed to the driverless general-purpose print program and the driverless general-purpose print program transmits the passed print data to the printer.

12. An information processing device comprising a computer, wherein an operating system of the information processing device includes a driverless general-purpose print program that is a pre-installed program, a support program corresponding to a printer connected to the information processing device, and an application program capable of inputting a print instruction for causing the printer to print an image via the driverless general-purpose print program are installed in the information processing device, and the computer executes, in a case where the print instruction is output from the application program, and in a job based on the print instruction, the printer is caused to execute aggregate printing in which images for N pages are printed on one surface of a sheet, N being a natural number of 2 or more:

receiving processing in which the support program receives image data for images of a plurality of pages from the driverless general-purpose print program;

composition processing in which the support program reduces the images of the plurality of pages in size and generates composite image data corresponding to the composite image in which the images for the N pages are arranged so as to fit on one surface of the sheet from the image data received in the receiving processing; and output processing in which the support program causes the information processing device to transmit print data rasterized based on the composite image data to the printer.

13. A printing method which uses a printer and an information processing device connected to the printer, the information processing device including:
   a printer connected to an information processing device;
   an operating system of the information processing device including a driverless general-purpose print program that is pre-installed in the operating system;
   a support program corresponding to the printer; and
   an application program capable of inputting a print instruction for causing the printer to print an image via the driverless general-purpose print program, and
   the printer being caused to perform printing based on print data generated by the information processing device, the method comprising:
   in a case where the print instruction is output from the application program, and in a job based on the print instruction, the printer is caused to execute aggregate printing in which images for N pages are printed on one surface of the sheet, N being a natural number of 2 or more,
   receiving, by the support program, image data for images of a plurality of pages from the driverless general-purpose print program;
   reducing, by the support program, the images of the plurality of pages and generating composite image data indicating the composite image in which the images for the N pages are arranged so as to fit on one surface of the sheet from the received image data; and
   causing, by the support program, the information processing device to transmit print data which generated by rasterizing the composite image data with the information processing device to the printer.

* * * * *